United States Patent
Scheibner et al.

[11] Patent Number: 5,945,649
[45] Date of Patent: Aug. 31, 1999

[54] ATOMIC VAPOR LASER ISOTOPE SEPARATION OF LEAD-210 ISOTOPE

[75] Inventors: Karl F. Scheibner, Tracy; Christopher A. Haynam; Michael A. Johnson, both of Pleasanton; Earl F. Worden, Diablo, all of Calif.

[73] Assignee: United States Enrichment Corp., Bethesda, Md.

[21] Appl. No.: 08/863,383

[22] Filed: May 27, 1997

[51] Int. Cl.[6] ......................................................... B01D 5/00
[52] U.S. Cl. .................................. 204/157.2; 204/157.21; 204/157.22; 204/157.3
[58] Field of Search ........................... 204/157.15, 157.2, 204/157.21, 157.22, 157.3

[56] References Cited

U.S. PATENT DOCUMENTS

| | | | |
|---|---|---|---|
| 4,734,177 | 3/1988 | Robinson et al. | 204/157.2 |
| 5,088,820 | 2/1992 | Winefordner et al. | 356/301 |
| 5,110,562 | 5/1992 | Sasao et al. | 422/186 |

*Primary Examiner*—Kathryn Gorgos
*Assistant Examiner*—Edna Wong
*Attorney, Agent, or Firm*—David G. Beck; Townsend and Townsend and Crew LLP

[57] ABSTRACT

An isotopically selective laser process and apparatus for removal of Pb-210 from natural lead that involves a one-photon near-resonant, two-photon resonant excitation of one or more Rydberg levels, followed by field ionization and then electrostatic extraction. The wavelength to the near-resonant intermediate state is counter propagated with respect to the second wavelength required to populate the final Rydberg state. This scheme takes advantage of the large first excited state cross section, and only modest laser fluences are required. The non-resonant process helps to avoid two problems: first, stimulated Raman Gain due to the nearby F=3/2 hyperfine component of Pb-207 and, second, direct absorption of the first transition process light by Pb-207.

3 Claims, 3 Drawing Sheets

ATOMIC VAPOR LASER ISOTOPE SEPARATION OF LEAD-210 ISOTOPE

STATEMENT AS TO RIGHTS TO INVENTIONS MADE UNDER FEDERALLY SPONSORED RESEARCH AND DEVELOPMENT

The United States government has rights in this invention pursuant to Contract Number W-7405-ENG-48 between the United States Department of Energy and the University of California.

BACKGROUND OF THE INVENTION

In its natural unmined state, lead contains a number of isotopes, including $^{210}$Pb. $^{210}$Pb is radioactive with a half-life of about 22 years. Therefore, "artesian lead," being centuries old, has a significantly lower concentration of $^{210}$Pb compared to natural lead that is relatively young.

The world's supply of artesian lead is disappearing, unfortunately, at the same time the demand for it is increasing. Many electronic applications require lead (particularly for solder) with an unusually low concentration of $^{210}$Pb. The radioactivity of $^{210}$Pb ultimately results in $\alpha$ particles that cause soft errors in electronic circuits.

Also, the electronic industry is moving to higher densities and three-dimensional architectures. Sensitivity to $\alpha$ particles increases with decreasing voltage, feature size and increasing numbers of interconnects and density.

Atomic vapor laser isotope separation (AVLIS) has been demonstrated on a number of elements, including uranium, gadolinium and other lanthanide elements. For example, Paisner et al., U.S. Pat. No. 5,202,005 (1993), teaches isotopic enrichment of $^{157}$Gd by selective photoionization.

However, whether AVLIS is technically feasible for a specific element typically requires detailed consideration of a wide variety of issues including the photo-pathway, spectroscopic preparation of the feed vapor stream and the efficient collection of the product free of contamination by either tailings or feed. A definitive evaluation of the applicability of AVLIS requires knowledge of the isotope shifts, hyperfine splittings, state energies and designations, state lifetimes and branching ratios. For those cases where AVLIS is technically feasible, an economic evaluation follows to determine the cost competitiveness of this technique versus the product value, for example.

These analyses require knowledge of the photo-pathway, knowledge of the number, powers, frequencies and other characteristics of the lasers, as well as knowledge of the material properties which lead to the determination of the vapor properties. Photo-pathways typically require excessive laser power and do not result in an economically realizable isotope separation process. Careful matching of existing lasers to possible transitions is also an economic consideration.

With Pb, for example, the F=3/2 hyperfine component of $^{207}$Pb is the nearest neighbor of $^{210}$Pb and has a natural abundance of about 23%. The isotope shift for a transition between $^{210}$Pb and $^{207}$Pb is about 1 GHz. The close frequency proximity of $^{210}$Pb and its nearest neighbor tends to give rise to stimulated Raman scattering (SRS).

A related problem is that $^{207}$Pb absorbs a substantial amount of 283 nm (doubled 556 nm) power that is expensive to generate.

Both problems are important because of the small isotope shift and the very small natural abundance of $^{210}$Pb, at most on the order of parts per billion.

Laser isotope separation of lead, if developed, can produce a reliable, cost-effective and very large (on the order of one to ten metric tons per annum) supply.

SUMMARY OF THE INVENTION

Herein is disclosed an isotopically selective laser process and apparatus for removal of Pb-210 from natural lead that involves a one-photon near-resonant, two-photon resonant excitation of one or more Rydberg levels (i.e., particle energy levels defined by the Rydberg equation), followed by field ionization and then electrostatic extraction. The wavelength to the near-resonant intermediate state is counter propagated with respect to the second wavelength required to populate the final Rydberg state. This scheme takes advantage of the large first excited state cross section, and only modest laser fluences are required. The non-resonant process helps to avoid two problems: first, stimulated Raman effect (i.e., the inelastic light scattering process based on Raman scattering) due to the nearby F=3/2 hyperfine component of $^{207}$Pb and, second, direct absorption of the first transition process light by $^{207}$Pb.

BRIEF DESCRIPTION OF THE DRAWINGS

FIG. 1A illustrates a separation apparatus for the purification of Pb;

FIGS. 1A–1C illustrate three points in time of the operation of the apparatus of FIG. 1A;

DESCRIPTION OF THE PREFERRED EMBODIMENT

A method and apparatus for separating the isotope $^{210}$Pb from naturally occurring lead by ionization is described herein.

Figure 3:
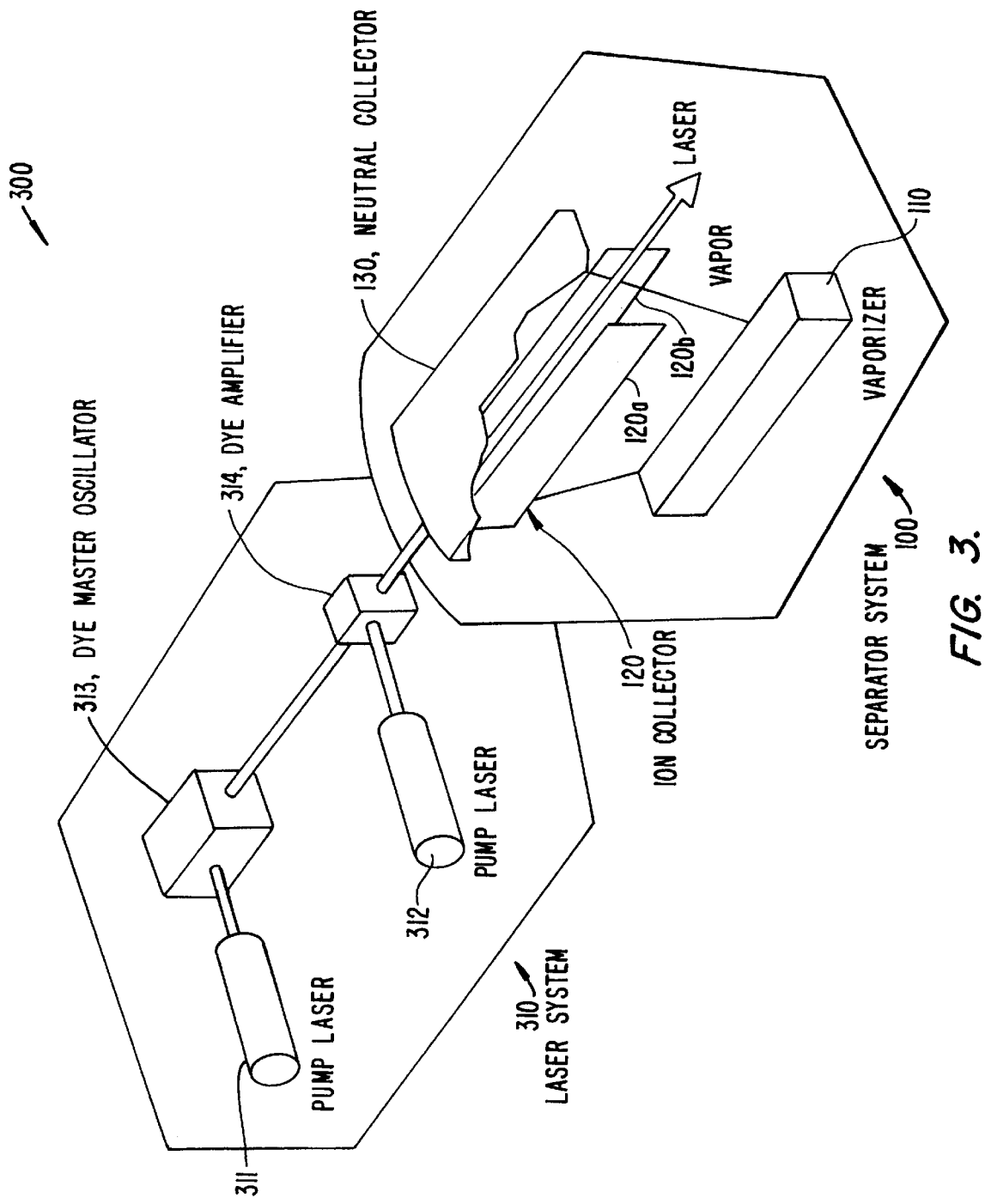
FIG. 3 illustrates an atomic vapor laser isotope separation (AVLIS) system including a laser subsystem optically coupled to a separator subsystem.

FIG. 3 illustrates an atomic vapor laser isotope separation (AVLIS) system 300 including a laser subsystem 310 optically coupled to a separator subsystem 100. The laser subsystem 310 includes first and second pump lasers 311, 312, dye master oscillator 313 and dye amplifier 314. The separator subsystem 100 includes a vaporizer 110, an ion collector 120 and a neutral collector 130.

Figure 1:
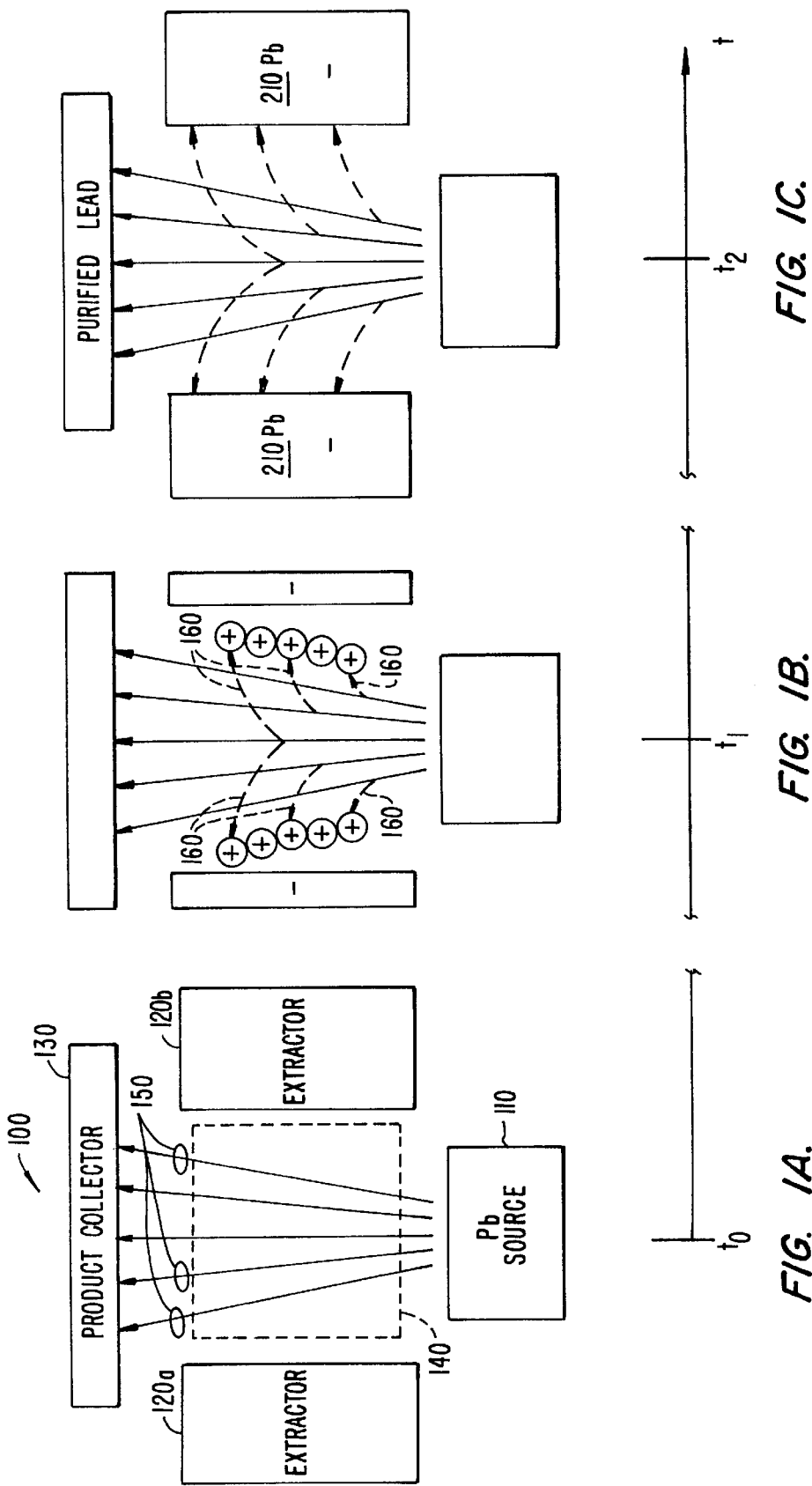

FIG. 1A illustrates the separator apparatus 100 for the purification of Pb. The apparatus 100 includes an multi-isotope source 110, a first, extractor-collector 120 and a second, product collector 130. The first, extractor-collector 120 has first and second collectors 120a and 120b, disposed on opposite sides of a zone 140. (The zone 140, being a space, is indicated in gray.)

FIGS. 1A–1C illustrate three points in time of the operation of the apparatus 100. At time $t_0$, the Pb source 110 produces a stream of isotopes according to processes well known in the art. A (non-ionized) atom is represented by an arrow 150 indicating the path of the atom.

After the isotopes have entered the zone 140, a laser (not shown) excites the $^{210}$Pb isotopes into Rydberg states according to a process described below. The extractor-collector 120 is grounded to an electrically neutral or low-voltage (<15 V) state during this step.

At $t_1$ (here approximately 1 $\mu$sec after $t_0$), the extractor 120 is negatively charged. The subsequent attraction between the extractor-collector 120 and the field-ionized Rydberg atoms ⊕ draws the $^{210}$Pb atoms toward and to the extractor-collector 120. The momentum of the non-ionized atoms carries them toward and to the (preferably neutrally charged) product collector 130. In FIG. 1B, the dashed arrows 160 represent the path of the ions ⊕, and the arrows 150 continue to represent non-ionized atoms and their paths through the apparatus 100.

At a later time $t_2$, as shown in FIG. 1C, the bi-product $^{210}$Pb has collected on the still negatively charged extractor-collector 120, while the remaining, purified Pb has collected on the product collector 130. (An anode (not shown) of the apparatus 100 collects the free electrons from the zone 140.)

Figure 2:
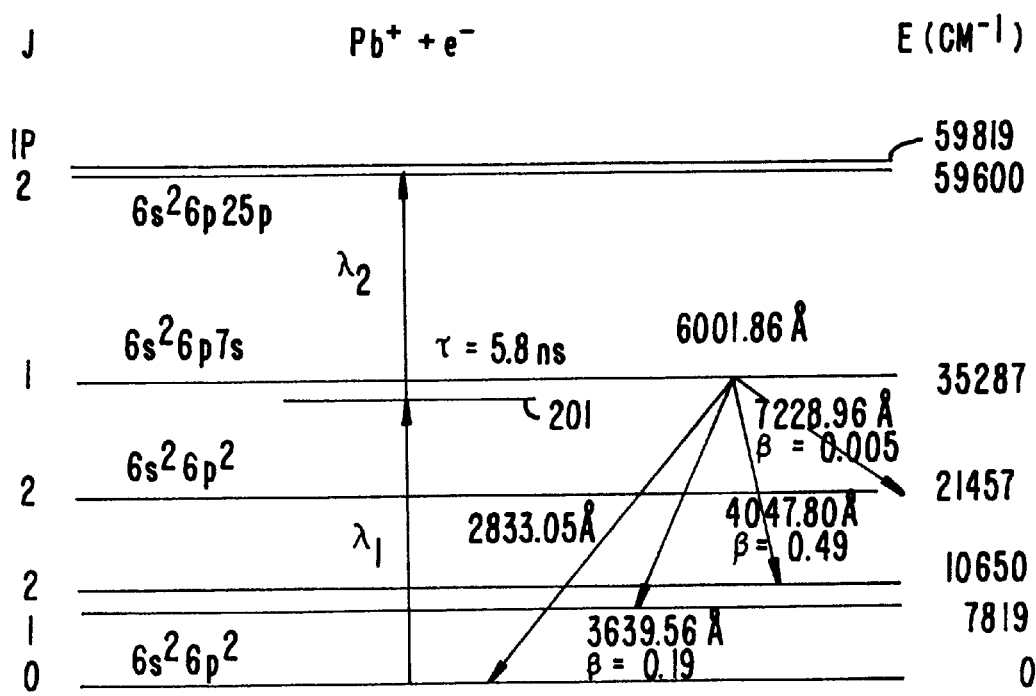
FIG. 2 is a specification of the photo-selective pathway for the atomic vapor laser isotope separation (AVLIS) of Pb.

The selective laser excitation of the $^{210}$Pb atoms of FIG. 1A is described below. FIG. 2 is a specification of the photo-selective pathway for the atomic vapor laser isotope separation (AVLIS) of Pb. FIG. 2 illustrates a two-photon process wherein a first photon of frequency $\lambda_1$ (up to 283 nm) excites a $^{210}$Pb atom at its ground state ($6s^26p^2$ state) to an intermediate, near-resonant state 201 near 35287 cm$^{-1}$. A second photon of frequency $\lambda_2$ (approximately 412 nm) counter propagates with respect to $\lambda_1$ and excites the atom to the final Rydberg state at 59600 cm$^{-1}$. This final Rydberg state is $6s^26pnp$, where $n \geq 19$.

(While the electron of the atom is not actually free (i.e., the atom is not in the continuum above the ionization potential at 59819 cm$^{-1}$), the atom is effectively ionized due to the high shell ($\geq 19$) that the electron occupies.)

This laser excitation process defeats the problems of stimulated Raman scattering (SRS) and $^{207}$Pb light absorption. It takes advantage of the large first excited state cross section that partially leads to the large SRS gain coefficient. The process requires only modest laser fluences, even for large detunings. No real population is transferred to the near-resonant intermediate level.

The process tunes the first step off-resonance and makes up for the detuning in the second step. The stimulated Raman effect due to the nearby F=3/2 hyperfine component of $^{207}$Pb is kept below threshold by the detuning. Since the SRS gain coefficient decreases by the square of the detuning, this effectively suppresses the SRS gain. A resonant transition would result in process light being diverted into the Raman transition.

The off-resonant nature of the process also reduces (and, in one embodiment, avoids) amplified spontaneous emission.

The two-photon process is on-resonance for $^{207}$Pb only, and the $^{207}$Pb first step is even farther off resonance. Direct absorption of the first transition process light by $^{207}$Pb is minimized since it is farther from resonance by construct than $^{210}$Pb. Since $^{207}$Pb is out of resonance in both steps, the $^{207}$Pb absorption is greatly reduced.

Notably, only one (here, the first) of the two lasers involved requires modulation.

The two process colors $\lambda_1$ and $\lambda_2$ are counter propagated with respect to each other to take advantage of their close frequency proximity. This proximity reduces the two-photon Doppler width. Since fluence per unit bandwidth is the important figure of merit, this width reduction in turn reduces the laser fluence requirements and increases the selectivity.

(A source 110 with a relatively narrow Doppler profile allows the light from the lasers to be more concentrated in frequency space while spanning the Doppler profile of the atomic vapor and facilitates laser isotope separation for those elements with small isotope shifts.)

Finally, by avoiding any real population of the near-resonant intermediate state, the difficulties of populating a level with a short 8 ns lifetime are avoided. All of the atomic population is in either the ground state or the Rydberg state.

Thus, isotope stripping can repeatedly illuminate the vapor, furthering the efficient isotopic purification of the lead. Stripping subjects the atomic vapor to multiple, sequential illumination zones 140 before the non-selected Pb collects on the neutral collector 130. Stripping increases the throughput and efficiency of an AVLIS system while reducing required laser power and interstage processing.

Also, repeated injections of the $\lambda_1$ beam (vis-a-vis the $\lambda_2$ beam) decreases the power broadening and increases the selectivity of the AVLIS system 300.

A first method for detecting $^{210}$Pb concentrations measure the alpha activities of $^{210}$Po, a granddaughter of $^{210}$Pb. The process dissolves a sample (e.g., 1–10 g) of lead, containing an unknown amount of $^{210}$Pb and adds a known amount of $^{209}$Po. The Po is plated out, and the relative amount of $^{210}$Pb is determined. The detection limit is better than 0.001 $\alpha$/cm$^2$/h. To infer $^{210}$Pb concentration, repeated measurements over several months are required to project to secular equilibrium.

Alternatively, beta-counting facilities can be used to determine $^{210}$Pb concentrations by beta counting its $^{210}$Bi daughter. This technique has the advantage that secular equilibrium is reached in about one month. While the present detection limit for the technique is not as sensitive as the alpha technique, it is useful to infer product assay from feed and by-product quantities.

For AVLIS systems separating elements with a significant reflection probability when hitting a surface (e.g., thallium and lead), a high surface collimator design reduces the non-selective pickup, increases the throughput of the systems and increases the purity of the enriched stream.

What is claimed is:

1. A method for selecting an isotope from lead having a plurality of isotopes including said isotope, said method comprising:

producing photons of a first frequency by a laser system, wherein said first frequency is greater than 0 and up to 283 nm;

producing photons of a second frequency by said laser system, wherein said second frequency is about 412 nm;

pumping said photons of said first and second frequencies into a vapor of said lead, wherein said photons of said first frequency excite a plurality of ground state $^{210}$Pb atoms to an intermediate, near-resonant state, and wherein said photons of said second frequency excite said plurality of atoms in said intermediate, near-resonant state to a final Rydberg state; and collecting said isotope.

2. The method of claim 1 wherein said step of collecting said isotope comprises applying an electric field to said vapor.

3. The method of claim 1, wherein said intermediate, near-resonant state is near 35287 cm$^{-1}$ and said final Rydberg state is near 59600 cm$^{-1}$.

* * * * *